(12) United States Patent
Bandholz et al.

(10) Patent No.: US 9,286,345 B2
(45) Date of Patent: Mar. 15, 2016

(54) QUERY TREE NAVIGATION

(75) Inventors: Justin P. Bandholz, Cary, NC (US);
William G. Pagan, Durham, NC (US);
William J. Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 1779 days.

(21) Appl. No.: 12/483,620

(22) Filed: Jun. 12, 2009

(65) Prior Publication Data

US 2010/0318536 A1    Dec. 16, 2010

(51) Int. Cl.
    *G06F 17/30* (2006.01)
(52) U.S. Cl.
    CPC .............................. *G06F 17/30395* (2013.01)
(58) Field of Classification Search
    CPC .................................................. G06F 17/30395
    USPC .................................................. 707/600–831
    See application file for complete search history.

(56) References Cited

U.S. PATENT DOCUMENTS

| | | | |
|---|---|---|---|
| 5,301,314 A | | 4/1994 | Gifford et al. |
| 5,463,773 A | | 10/1995 | Sakakibara et al. |
| 5,737,393 A | | 4/1998 | Wolf |
| 6,999,958 B2 | * | 2/2006 | Carlson et al. |
| 7,062,504 B2 | | 6/2006 | Cantu-Paz et al. |
| 7,130,391 B2 | | 10/2006 | Janakiraman et al. |
| 7,289,985 B2 | | 10/2007 | Zeng et al. |
| 7,346,609 B2 | * | 3/2008 | Chen et al. |
| 2003/0115289 A1 | | 6/2003 | Chinn et al. |
| 2003/0229639 A1 | * | 12/2003 | Carlson et al. ................ 707/100 |
| 2006/0106758 A1 | * | 5/2006 | Chen et al. ........................ 707/2 |
| 2009/0097634 A1 | | 4/2009 | Nambiar et al. |

OTHER PUBLICATIONS

Chinese Office Action No. 100034, Dated May 30, 2012, pp. 1-7.
Fujii Yoichi et al., "Method and Device for Retrieving Examples", JP2000267853(A), Sep. 29, 2000, Espacenet Bibliographic Data, 2 pages.
Fujii Yoichi et al., "Method and Device for Retrieving Examples", JP2000267853A, Sep. 29, 2000 English abstract, Job No. 2826:440962778, 12 pages.
Maruta Yuzo et al., "Failure Resolution Support Device", JP2004310692(A), Nov. 4, 2004, Espacenet Bibliographic Data, 2 pages.

(Continued)

*Primary Examiner* — Jean B Fleurantin
(74) *Attorney, Agent, or Firm* — Jeffrey L. Streets

(57) ABSTRACT

System, computer implemented method and computer program product for preparing and navigating a query tree including a plurality of query nodes and informational nodes. Each query node is associated with a prompt, branching criteria and keywords. A current query node provides a prompt to a user and a user response is received and analyzed to identify branching criteria and keywords from the user response. The method navigates to another node in the query tree in consideration of the branching criteria received in the user response and a comparison between the keywords received in the user response and the keywords associated with the query nodes. The comparison may validate navigation to a destination node corresponding to the branching criteria or the comparison may indicate incorrect navigation of the query tree. Corrective navigation can be implemented in various ways based upon the keywords received in the user response.

14 Claims, 9 Drawing Sheets

(56) References Cited

OTHER PUBLICATIONS

Hayashi Ichiro et al., "Priority Question Output Unit and Program", JP2008293275(A), Dec. 4, 2008, Espacenet Bibliographic Data, 2 pages.

Omori Akiyo et al., "Trouble Diagnosing Device", JPH04321133(A), Nov. 11, 1992, Espacenet Bibliographic Data, 2 pages.

Creamer et al. "Telephony Signals Containing an IVR Decision Tree", TW200423688A English Abstract, International Business Machines Corporation, Nov. 1, 2004, 15 pages.

* cited by examiner

| Query Node ID | Prompt | Branch 1 Criteria | Branch 1 Destination Node ID | Branch 2 Criteria | Branch 2 Destination Node ID | Associated Keywords (from Descendent Nodes) |
|---|---|---|---|---|---|---|
| 100 | Boy Scouts? | Yes | 101 | No | 110 | Eagle, Tan, Green, Troop, Patrol, Quartermaster, Pioneering, First Aid, Aviation, Fort AP Hill, Virginia, Webelos, Blue, Tan, Green, Pack, Den, Ranger |
| 101 | National Jamboree? | Yes | A | No | 102 | Eagle, Tan, Green, Troop, Patrol, Quartermaster, Pioneering, First Aid, Aviation, Fort AP Hill, Virginia |
| 102 | Merit Badges? | Yes | B | No | 103 | Eagle, Tan, Green, Troop, Patrol, Quartermaster, Pioneering, First Aid, Aviation |
| 103 | Uniforms? | Yes | C | No | D | Eagle, Tan, Green, Troop, Patrol, Quartermaster |
| 110 | Cub Scouts? | Yes | 111 | No | G | Webelos, Blue, Tan, Green, Pack, Den, Ranger |
| 111 | Uniform? | Yes | E | No | F | Webelos, Blue, Tan, Green, Pack, Den |

*FIG. 4A*

| Informational Node ID | Information | Keywords |
|---|---|---|
| A | The 2010 National Scout Jamboree will be held from July 26, 2010 through August 4, 2010 at Fort A.P. Hill Virginia. Each Jamboree Troop consists of 36 youth organized into 4 Patrols with 8 youth per Patrol plus 4 youth Troop leaders who are not a part of any Patrol. | Fort AP Hill, Virginia, Troop, Patrol |
| B | Boy Scouts can earn Merit Badges from a list of over 100 Merit Badges, including... Aviation....First Aid...Pioneering.... | Pioneering, First Aid, Aviation |
| C | Boy Scouts wear a uniform that consist of a tan shirt, green pants or shorts, and green socks. The uniform includes a rank badge (such as the Eagle rank) worn on the left shirt pocket. | Eagle, Tan, Green |
| D | A Boy Scout Troop is led by the youth. The youth hold positions such as Patrol Leader, Quartermaster, and Troop Guide. The Troop Guide is an older, experienced Scout (often an Eagle Scout) who works with a new Scout patrol. | Eagle, Troop, Patrol, Quartermaster |
| E | Webelos Scouts may continue to wear their blue Cub Scout uniform until they outgrow it. When they have outgrown the Cub Scout uniform, they should begin wearing the tan shirt and green pants of the Boy Scout uniform. | Webelos, Blue, Tan, Green |
| F | Within a Cub Scout Pack, boys of the same age are organized into a Den. Cub Scout ranks progress from the youngest (Tiger Cubs) through Wolf and Bear to the oldest (Webelos). | Webelos, Pack, Den |
| G | The Venturing program recognizes youth members who have demonstrated the highest level of outdoor skills proficiency by presenting them with the Ranger Award. | Ranger |

FIG. 4B

QUERY TREE NAVIGATION

BACKGROUND OF THE INVENTION

1. Field of the Invention

The present invention relates to the preparation and use of query trees, such as may be used in call centers, help desks, or informational applications and web pages.

2. Background of the Related Art

Help desks and call centers are set up to have personnel, referred to as call handlers, lead callers through a series of questions intended to first identify an individual or organization with the expertise to handle the call and then to determine a proper response to give the caller. Since call handlers may not be experts on the topics being discussed with the caller, a common approach is for the call handlers to use software that prompts them to ask specific questions of the caller while the software navigates a query tree. A "query tree" gets its name because a graphical representation of the series of questions connected by branches resembles a stereotypical triangular tree, with an initial node at the top branching downward to multiple nodes, which themselves branch to multiple nodes, until a much wider base is formed. Specifically, the call handler is presented with one question at a time to ask the caller, wherein the question corresponds to a node in the tree. Based upon the caller response to that question, a branching decision is made within the tree, leading to the next question or a reply to give the caller. This process of question and response can continue any number of times, as determined by a query tree designer or programmer, to navigate through the query tree. Theoretically, the series of questions and responses should eventually lead the caller to the information sought, which may be a voice connection to an individual with the required expertise, a recorded statement containing information about a given subject matter, or data leading to further information.

Rather than always involving a live call handler, some help desks or call centers may implement a fully automated query tree, such as an interactive voice response system. Typically, an interactive voice response system allows a caller to navigate a query tree by playing a prerecorded or voice synthesized question and then using voice recognition techniques to identify the caller's response. Ideally, the caller is able to navigate promptly and directly to the desired information. Unfortunately, a misunderstood question, a mistaken caller response, or an unrecognizable voice response can prevent the caller from obtaining the desired information.

A closely similar automated system requires the caller to enter numerical responses to each question, such as through a telephone keypad, in order to navigate the query tree. Although a numerical response is easier to recognize than a voice response, the question must generally include a statement explaining the meaning of several numerical response. These statements can become quite lengthy and difficult for the caller to remember and evaluate. For example, an automated system for a bank might say "Press 1 for new accounts; Press 2 for existing account balances; Press 3 for auto loans; Press 4 for hours of operation; Press 5 for retirement accounts; . . . " A caller wanting information about setting up a new individual retirement account (IRA) may be confused whether to press 1 for new accounts or press 5 for retirement accounts.

Although the use of low-expertise call handlers and automated systems may result in significant financial savings to the businesses or governmental entities that employ them, there is potential for a caller to become frustrated at the amount of time and effort required to obtain the information that they need. A carefully designed and scripted query tree can significantly improve a caller's experience with such systems, but there remains a need for improved call systems.

BRIEF SUMMARY OF THE INVENTION

One embodiment of the present invention provides a computer implemented method comprising communicating a prompt to a user, wherein the prompt is provided by a current query node in a query tree. The query tree includes a plurality of query nodes, a plurality of branches, and a plurality of informational nodes, each branch corresponding to branching criteria associated with a specific query node and directing navigation from the associated query node to another of the query nodes or one of the informational nodes. Each query node provides a prompt and each informational node provides information available to the user. Furthermore, each query node is associated with one or more keywords. The computer implemented method further comprises receiving a user response to the prompt and analyzing the user response to identify branching criteria that corresponds to one of the plurality of branches leading from the current query node to a different one of the query nodes or one of the informational nodes. The user response is also analyzed to identify one or more keywords from the user response. The query tree is then navigated to another node in the query tree in consideration of the branching criteria from the user response and a comparison between the one or more keywords from the user response and keywords associated with the query nodes.

Another embodiment of the present invention provides a computer implemented method comprising preparing a query tree having a plurality of query nodes, each query node including a query, branching criteria and predetermined keywords. The method then prompts a user to respond to the query from a first one of the query nodes, receives a user response to the query, analyzes the user response to identify a branching criteria and one or more user keywords, and compares the one or more user keywords with the predetermined keywords from one or more of the query nodes.

A further embodiment of the present invention provides a computer program product including computer usable program code embodied on a computer usable medium. The computer program product comprises computer usable program code for establishing a query tree, wherein the query tree includes a plurality of query nodes, a plurality of branches, and a plurality of informational nodes, each branch corresponding to branching criteria associated with a specific query node and directing navigation from the associated query node to another of the query nodes or one of the informational nodes, wherein each query node provides a prompt and each informational node provides information available to the user; and computer usable program code for associating each query node with one or more keywords.

BRIEF DESCRIPTION OF THE SEVERAL VIEWS OF THE DRAWINGS

FIGS. 4A and 4B are tables or databases that define the query tree of FIG. 3.

DETAILED DESCRIPTION OF THE INVENTION

Figure 1:
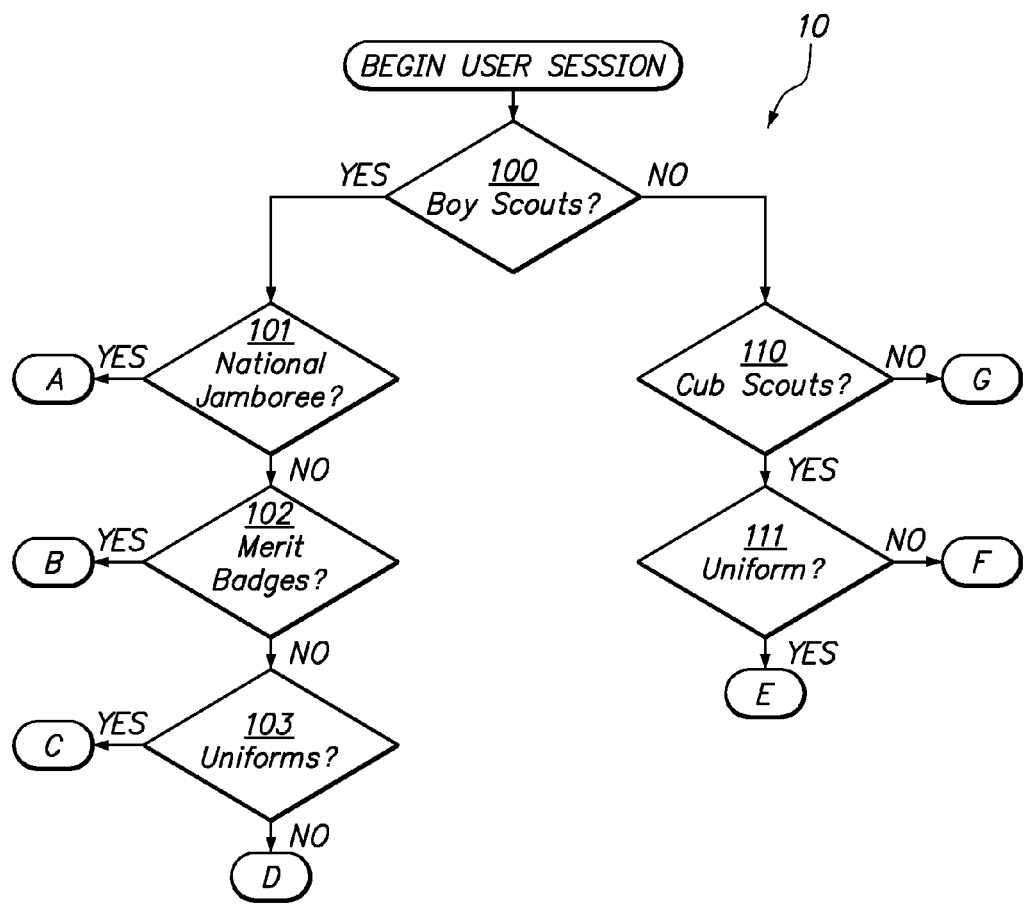
FIG. 1 is an example of a query tree for providing a user with information about scouting programs.

One embodiment of the present invention provides a system, computer implemented method and computer program product for navigating a query tree. The method of this embodiment comprises communicating a prompt to a user, wherein the prompt is provided by a current query node in a query tree. The query tree includes a plurality of query nodes, a plurality of branches, and a plurality of informational nodes, each branch corresponding to branching criteria associated with a specific query node and directing navigation from the associated query node to another of the query nodes or one of the informational nodes. Each query node provides a prompt and is associated with one or more keywords. Each informational node provides information available to the user. The method of this embodiment further comprises receiving a user response to the prompt. The user response is analyzed to identify a branching criteria that corresponds to one of the plurality of branches leading from the current query node to a different one of the query nodes or one of the informational nodes, and also to identify one or more keywords from the user response. The method navigates to another node in the query tree in consideration of the branching criteria received in the user response and a comparison between the one or more keywords received in the user response and the one or more keywords associated with the query nodes.

The user navigates through the query tree by providing responses to prompts, which are typically designed to effectively determine the user's need for information. User responses may be provided in various forms as appropriate to the user interface of a system that implements the query tree. For example, user responses may be spoken or numerical where the user interface is a telephone in communication with a telephone network, or the user responses may include alphanumeric or point-and-click input wherein the user interface is a computer workstation in communication with a computer network. Other interfaces may also be utilized so that the user may navigate a query tree.

It should be recognized that a query tree lends itself to graphical illustration and description, but may be implemented as one or more table or database. For example, in a table or database, each row or record may define a query node. Individual fields within a record defining a query node may provide a prompt, branching criteria, destination node identification for each branching criteria, and associated keywords. A destination node may be another query node or an informational node. An informational node provides information or other service access that the user needs. The embodiments described with reference to the Figures, below, deal with the informational nodes as being terminal nodes, but it is also possible for the informational nodes to include a prompt, branching criteria and corresponding destination node identifications. In the latter case, the information or service access may be provided, followed by a prompt for a user response. This and other specific implementations and derivations of the present invention will become apparent to those having skill in the art after they have gained an understanding of the techniques disclosed in this application.

Furthermore, each node may have any number of branching criteria (branches), but the number of branching criteria is preferably from 1 to 10 in order to avoid user confusion over an appropriate response. For example, branching criteria may include binary branching criteria, such as yes/no or true/false, or any other qualitative or quantitative branching criteria. It should also be recognized that the prompt may or may not provide the user with examples of proper responses. For example, the query tree system may inform the user that the acceptable responses are "yes" or "no." Furthermore, the query tree system may or may not indicate to the user how many branches there might be from the present query node. For example, if the prompt requests the user to state their age, the user response might include a spoken word or numerical entry "43." In separate options, the query tree may be built with branching criteria for each integer number of years (i.e., 16, 17, 18 . . . 41, 42, 43 . . . 68, 69, 70, etc.), branching criteria that establishes an age range (20-29, 30-39, 40-49, etc.), or branching criteria that merely determines if the age is over 21 or over 65. In another example, the prompt may ask for the user response to indicate the name of the city and state in which the user resides. Because of the vast range of cities that might be stated, the system may receive the user response and lookup related information that would be helpful to the query tree operation. If a user response indicated that the user resided in Holly Springs, N.C., then the system could search a separate database that returns information about the cable television rate plans available in Holly Springs. The available rate plans might then be used as the branching criteria that would indicate the information or further prompts that should be provided to the user.

In one embodiment, the user may interface directly with the system implementing the query tree. For example, using any input/output device, such as a telephone or computer, a user may directly receive prompts over a speaker or graphical display and may directly provide a response via a microphone, keyboard, or mouse. If the user is interacting with a remote server, the input/output may be communicated over a local area network, wide area network such as the internet, a telephone network, or some combination thereof. Optionally, the query tree is implemented in a computer directly accessible to the user, such as at a kiosk or retail establishment. In an alternative embodiment, the user may communicate with a call handler (a person) who reads the prompts and inputs the user responses without any necessary changes to the query tree or system implementing the query tree.

According to various embodiments, the user response is analyzed to identify branching criteria and one or more keywords other than the branching criteria. If the user response is received as an audible signal, for example a spoken sentence received over a telephone network, then a preliminary step in analyzing the user response may include a voice recognition system that converts the audible signal to equivalent alphanumeric data. Alphanumeric data, whether converted from an audible signal or received directly as alphanumeric input, may be parsed to identify words or other data that match any of the branching criteria or keywords associated with the query node that provided the prompt. Various standards may be utilized to characterize a "match", but typically common variations in spelling and forms of the branching criteria or keywords would be considered a match. For example, a branching criteria included in a query tree database may be stored as "theater", but a user response including "theatre" or "theatrical" would still be considered a match. In a user response, articles such as "the" and "an", and conjunctions such as "for", "and", "or" and "but", would typically be ignored as being neither branching criteria nor keywords that indicate the users objectives. Nouns, pronouns, adjectives, verbs, and adverbs, as well as numbers, are preferably used as branching criteria or keywords associated with the query node. Identified nouns, pronouns, adjectives, verbs, and adverbs in a user response may be compared against branching criteria and keywords associated with the current query node to identify a match that can be used to navigate the query tree. Optionally, the content of the user response may be analyzed to identify degrees of relevance, as opposed to a match, with branching criteria and keywords. For example, a user response including the word "drink" would not match either "coffee" or "donuts", but is found to be more relevant to "coffee".

In accordance with one embodiment, the computer implemented method includes navigating the query tree from the current query node to a destination node in response to determining that the user response includes branching criteria corresponding to a branch leading from the current query node. It should be emphasized that branching criteria, such as "yes" and "no", may be utilized more than once in a query tree. Still, the identification of branching criteria in any given user response must focus on the branching criteria corresponding to a branch leading from the current query node. Once the branching criteria is identified, and preferably validated as described below, the query tree is navigated to a destination node associated with the branching criteria. However, what was referred to as destination node for one step of navigation, becomes the current node for the next step of navigation. Optionally, it may be considered that a pointer continuously identifies the current node of the query tree and moves from node to node during navigation. This process continues throughout a single user session with the query. In a further option where the query tree is complex, such as troubleshooting a computer problem, the user may be allowed to save their user session and return later to continue at the same point in the query tree.

In yet another embodiment, the computer implemented method may comprise accepting navigation to the destination node in response to determining that the one or more keywords in the user response match, or are at least relevant to, the keywords associated with the destination node. A determination that keywords in the user response that match keywords associated with a destination node is useful to validate that the current navigation through the query tree is proceeding consistent with the user's needs or interests. Simply following branching criteria may not accurately or timely detect improper navigation. For example, if a query tree for a veterinary clinic issued a prompt of "How old is your canine?" and received a user response of "My cat is 6 years old", then the branching criteria of "6 years old" may indicate a destination node, but the keyword of "cat" may not match or be relevant to any informational nodes distal to the current query node. Specifically, the query tree had apparently already been traversed improperly, perhaps because of an incorrect response to an earlier prompt of "Is your pet a canine or a feline?" Conversely, a user response of "My puppy is 7 months old" might be determined to match, or be relevant to, the branching criteria of "canine" and serve to validate the query tree navigation.

It should be noted that a query node may become associated with a one or more keywords in various manners, either alone or in combination. For example, it is possible to layout a query tree, including the query nodes and branching criteria, and identify the information or content of each informational node. Keywords from the information may be identified and associated with each query node along a path traversing the query tree backward to the initial query node. Accordingly, the keywords associated with a query node are representative of information that may be obtained by navigating down through any of that node's branches. As another example, the keywords associated with a particular query node may be developed incrementally over time by storing keywords from user responses that lead to the user reaching the desired information. Combinations of these two approaches, as well as other approaches, may be used to associate keywords with any given node in the query tree. As used herein, a distal node is any node that can be reached from the current node by positive navigation of the query tree (i.e., simply providing any of the branching criteria for each node). A proximal node is any node that could only be reached by some amount of negative navigation of the query tree (i.e., returning to a node previously navigated during the user session). Proximal nodes also include nodes branching from proximal node, so long as those nodes are not the node of interest of nodes distal thereto.

In a related embodiment, the computer implemented method may comprise accepting navigation to the destination node in response to determining that the one or more keywords from the user response are not relevant to the keywords associated with any query node proximal of the destination node. In other words, if the keywords in the user response are irrelevant to any nodes proximal to the current query node, then there is nothing in the user response to contradict the selection of the branching criteria. Accordingly, the query tree should be navigated to the destination node identified by the branching criteria in the user response.

In a further embodiment, the computer implemented method comprises storing each user response received in relation to each prompt during a user session, and returning to a previously navigated query node in response to determining that the user response to a current prompt includes keywords that are more relevant to the previously navigated query node than the current query node. Yet another embodiment of the method comprises navigating to a query node associated with keywords that are determined to be more relevant to the one or more keywords in the user response than the keywords associated with the current query node. Because these two embodiments may significantly redirect navigation of the query tree, it may be preferably repeat the prompt and receive a further user response before navigating in this manner. For example, the method may comprise repeating the prompt from the current query node in response to receiving a user response including one or more keywords that are not relevant to any of the keywords associated with the current query node.

An alternative embodiment of the invention provides a computer implemented method comprising: preparing a query tree having a plurality of query nodes, each query node including a query, branching criteria and predetermined keywords; prompting a user to respond to the query from a first one of the query nodes; receiving a user response to the query; analyzing the user response to identify a branching criteria and one or more user keywords; and comparing the one or more user keywords with the predetermined keywords from one or more of the query nodes. Optionally, the step of comparing the one or more user keywords with the predetermined keywords from one or more of the query nodes includes comparing the one or more user keywords with the predetermined keywords from a query node that is identified by the branching criteria (i.e., a destination node). The method may further comprise navigating from the first one of the query nodes to the query node identified by the branching criteria in response to the one or more user keywords matching the predetermined keywords from the query node identified by the branching criteria. Independently, the method may further comprise navigating from the first one of the query nodes to a different query node in the query tree in response to the one or more user keywords matching the predetermined keywords from at least one of the query nodes in the query tree and the one or more user keywords not matching the predetermined keywords from the query identified by the branching criteria.

Yet another embodiment of the invention provides a computer program product including computer usable program code embodied on a computer usable medium, wherein the computer program product comprises computer usable program code for establishing a query tree. The query tree includes a plurality of query nodes, a plurality of branches, and a plurality of informational nodes, each branch corresponding to branching criteria associated with a specific query node and directing navigation from the associated query node to another of the query nodes or one of the informational nodes. As with previous embodiments, each query node provides a prompt and each informational node provides information available to the user. The product further comprises computer usable program code for associating each query node with one or more keywords. Other embodiments of the computer program product may include computer usable program code for performing any of the steps of the method embodiments described herein.

FIG. 1 is an example of a query tree. This specific query tree 10 is a hypothetical query tree for Boy Scouts of America to provide a user with information about scouting programs. (Boy Scouts of America, Boy Scouts, Cub Scouts, Venturing and National Jamboree are trademarks of the Boy Scouts of America Corporation of Irving Tex.). The initial query node 100 provides a prompt that attempts to narrow the caller's inquiry down to a specific BSA program, such as Boy Scouts or Cub Scouts, but could also be structured to identify inquiries about Venturing, etc. An affirmative response to the prompt in query node 100, such as "Boy Scouts?" or "Do you have a question about the Boy Scout program?", navigates to destination node 101, whereas a negative response navigates to query node 110. If an affirmative branching criteria navigates to node 101, node 101 becomes the new current node and provides a prompt regarding National Jamboree (a Boy Scout event). Conversely, if negative branching criteria navigates to node 110, then node 110 becomes the new current node and provide the prompt "Do you have a question regarding the Cub Scout program?" Some query nodes 101, 102, 103 are very specific to the Boy Scout program leading to other query nodes and, eventually leading to informational nodes providing information or content to the user. The informational nodes related to Boy Scouting are identified in FIG. 1 as ovals marked A, B, C, and D. Other query nodes and user responses may branch to informational nodes E, F, and G related to other programs under BSA. Although the diagrams and discussion presented here show only yes/no responses to the questions, the invention does not in any way preclude implementing one or more query node with multiple branches each with their own branching criteria.

A problem that may arise during the use of a query tree is that some users might not be familiar with terminology used in asking the questions or might not have sufficient background or experience to give correct answers. For example, envision a 5th grader's grandmother calling to ask a question about the uniform that her Webelos grandson should be wearing. When asked the first question "Do you have a question about the Boy Scout program?" the grandmother may make a common mistake, which is to confuse Cub Scouting and Boy Scouting. Especially since the name of the organization is Boy Scouts of America, she may respond "yes" to this question. However, this valid, but mistaken response leads to navigation down the left side of the query tree 10 (as illustrated in FIG. 1) so that the user would never reach query nodes 110, 111, or informational node E, which would provide the information that the grandmother seeks. The result may be wasted time on the call and escalation of the user to a more knowledgeable (and therefore more costly) higher level of support.

Figure 2:
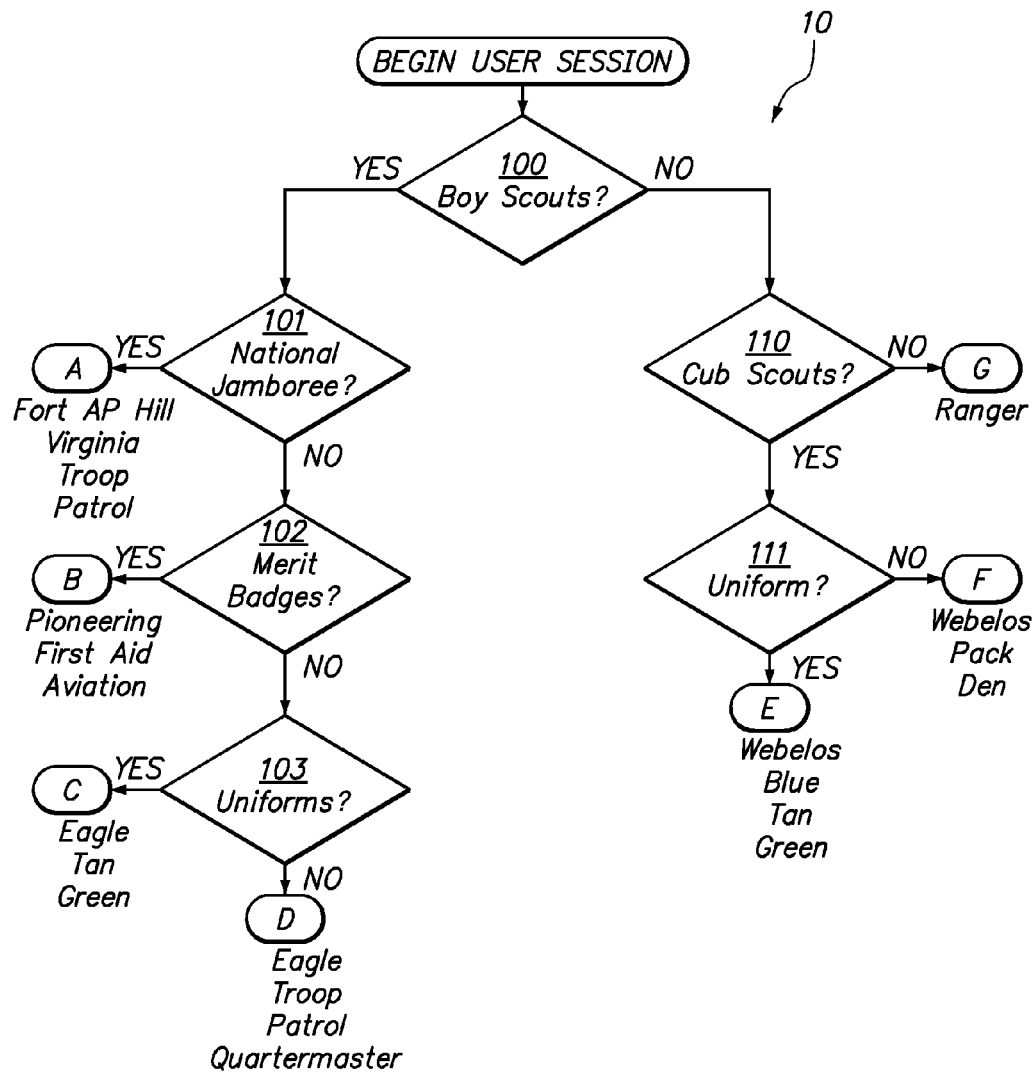
FIG. 2 is a query tree having keywords associated with each of the informational nodes.

FIG. 2 is the query tree 10 having keywords associated with each of the informational nodes. These keywords are, for example, nouns and adjectives found in, or otherwise associated with, the information or content of each respective informational node A-G.

Figure 3:
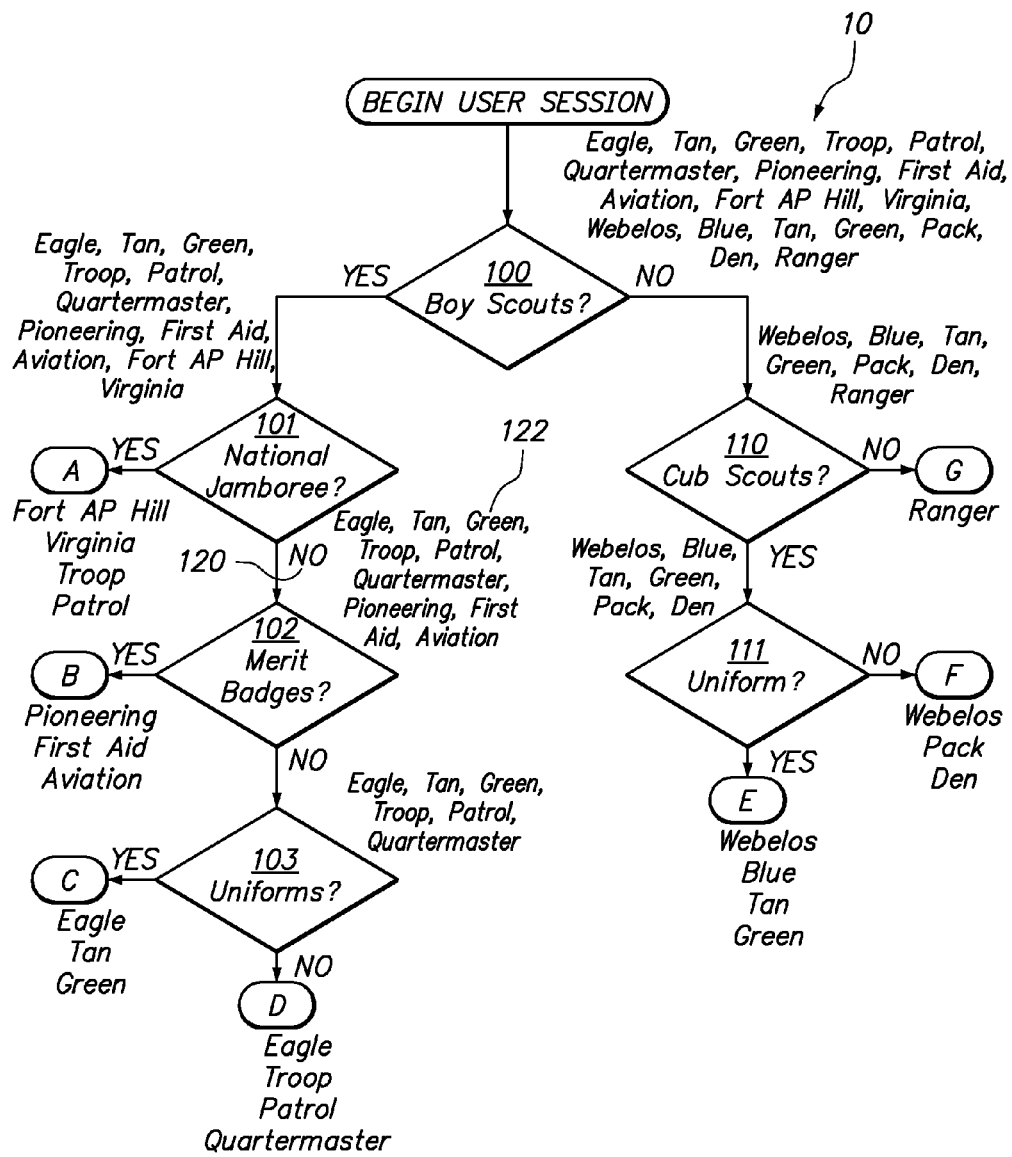
FIG. 3 is a query tree illustrating the keywords that may be used at each query node to validate or redirect the user's navigation of the query tree.

FIG. 3 is the query tree 10 illustrating the keywords that may be associated with each query node and used to validate or redirect the user's navigation of the query tree. The keywords from each informational node A-G are propagated up through the tree so that each query node is associated with the keywords of all distal informational nodes.

Having prepared the query tree 10 with each query node having associated branching criteria and keywords, the query tree system or software is prepared to initialize a user session, provide prompts to a user interface and receive user responses. The user response received for a given prompt is analyzed to identify the user's selection of branching criteria and any user keywords (other than the branching criteria) that may be used to determine an appropriate destination node. Keywords may be parsed from a freeform user response or specifically entered by the user or call handler believing the keywords represent a significant detail related to the users needs.

For example, in reference to FIG. 3, after responding "Yes" to the prompt of query node 100 regarding whether her call was in regard to the Boy Scout program, the query tree navigates to query node 101 where the grandmother would receive the prompt "Are you calling about the National Jamboree?" If the grandmother's response was "No, I want to know if my grandson can wear a tan shirt in his Webelos den", the response can be analyzed to identify "No" as matching the branching criteria 120 and "shirt", "tan", "Webelos", and "den" as user keywords. The method would then compare the user keywords against keywords 122 associated with the destination node (node 102), which is identified by the branching criteria 120. If one or more keywords in the user response match a keyword associated with the destination node, then the navigation to the destination node is validated.

Other tests and comparison may be performed as described herein. Accordingly, if the keywords in the user response do not match a keyword associated with the current node, nor to any node proximal to the current node, then the keywords in the user response are deemed irrelevant and do not effect navigation through the query tree. A keyword that is not associated the destination node, but which is associated with the current node, or a node proximal to the current node, may be an indication that the query tree is not being traversed properly.

Continuing with the present example, the grandmother's negative response to the prompt in query node 101 would match the branching criteria 120 that identifies node 102 as the destination nod. However, the method will also compare the keywords "shirt," "tan," "Webelos," and "den" with keywords associated with various query nodes. The keyword "shirt" is not associated with the destination node 102 (i.e., "shirt" does not match a keyword 120), nor is "shirt" associated with any node proximal to destination node 102. Since the user keyword "shirt" is not associated with any node in the query tree, it is deemed to be irrelevant.

This process of comparing keywords is repeated for the word "tan," which is found to be associated with destination node 102 (the keyword arising from the discussion of Boy Scout uniforms at informational node C). Note that the word also appears on the right side of the query tree arising from a discussion of Cub Scout uniforms (specifically Webelos uniforms in node E, although this level of detail is not shown in the diagrams). Because the keyword is found attached to the destination node 102 even though it also appears elsewhere in the tree, the method determines that the keyword "tan" is relevant, but does not indicate an incorrect traversal of the query tree.

The process of comparing keywords is repeated two more times for the user keywords "Webelos" and "den." In both cases, the method determines that the keyword is not associated with the destination node 102, but is associated with the proximal node (node 100). This is an indication that the query tree has not been traversed properly. The initial query node 100 where the keywords first appear (when traversing backward up through the query tree) is an indication of where the navigation went astray.

When it has been found that the query tree has been navigated in an incorrect manner, any of a number of approaches may be used to navigate back on a correct track. As a first example, the method may provide a statement that the user responses during the session may have contained an error and repeat the prompt associated with the current node. Alternatively, the method may provide a more detailed prompt or an alternate version of the prompt. It should be recognized that these more detailed or alternate versions of the prompt may also be stored in association with the query node for use when needed.

In the present example, after detecting that navigation may have gone astray at node 100, the method may navigate to node 100 and provide the alternative prompt of "I'm seeing an indication that we may have answered the question about Boy Scouting incorrectly. Can you verify for me that your grandson is at least 11 years old or in 6th grade or above?" If the grandmother's response says "No, he's only in 4th grade," then the negative branching criteria associated with query node 100 would direct navigation to a destination node (here, node 110).

Proceeding with node 110 as the new current node, the method may provide a more detailed prompt "Is your grandson a Tiger Cub, Cub Scout, or Webelos Scout?" associated with node 110 in order to validate the navigation.

In a new user session, a second user may respond "Yes" to the prompt in the initial query node 100 and then, in response to the prompt regarding National Jamboree in query node 101, input "Yes, isn't it in Virginia again this year?" The method would identify "Yes" as the branching criteria and "Virginia" as a keyword in the user response. Because the branching criteria "Yes" indicates navigation to node A and because "Virginia" matches a keyword associated with the destination node (i.e., informational node A), the navigation to node A, consistent with the branching criteria, is validated. The method navigated the "Yes" branch from node 101 to node A to provide the user with information about the National Jamboree.

FIGS. 4A and 4B are illustrations of one possible embodiment of tables or databases that define the query tree of FIG. 3. In this embodiment, the table of FIG. 4A defines the query nodes and the table of FIG. 4B defines the informational nodes. In FIG. 4A, each query node has a separate record (row) including a query node identification (ID), a prompt, branching criteria 1 and a corresponding destination node ID, branching criteria 2 and corresponding destination node ID, and a list of associated keywords. In FIG. 4B, each informational node has a separate record (row) including an informational node identification (ID), information available to a user, and optional keywords arising from the information. These two tables work together to define the query tree, wherein certain branching criteria reference a destination node ID that identifies an informational node. Furthermore, the informational nodes give rise to keywords that are propagated up back up through the query tree and associated with each query node along the way. For example, the keywords associated with informational node A in FIG. 4B are associated with query node 101, because query node 101 has branching criteria 1 that points to informational node A. Then, these keywords are further associated with query node 100, because query node 100 has branching criteria 1 that points to query node 101. This process of association is performed for each informational node so that the keywords associated with each query node are as shown in the right hand column of the table of FIG. 4A.

It should be recognized that each record in the table of FIG. 4A may include additional columns for additional branching criteria and corresponding destination node IDs, so that the query node may branch in any number of directions. Furthermore, each record may include a more detailed version of the prompt, an alternate version of the prompt, and the like in order to implement other embodiments of the invention described herein. Also, the two tables could be combined. Still further, the informational nodes could include their own branching criteria and corresponding destination node IDs, such as to prompt the user whether they want to return to the top of the query tree to obtain further information.

Figure 5:
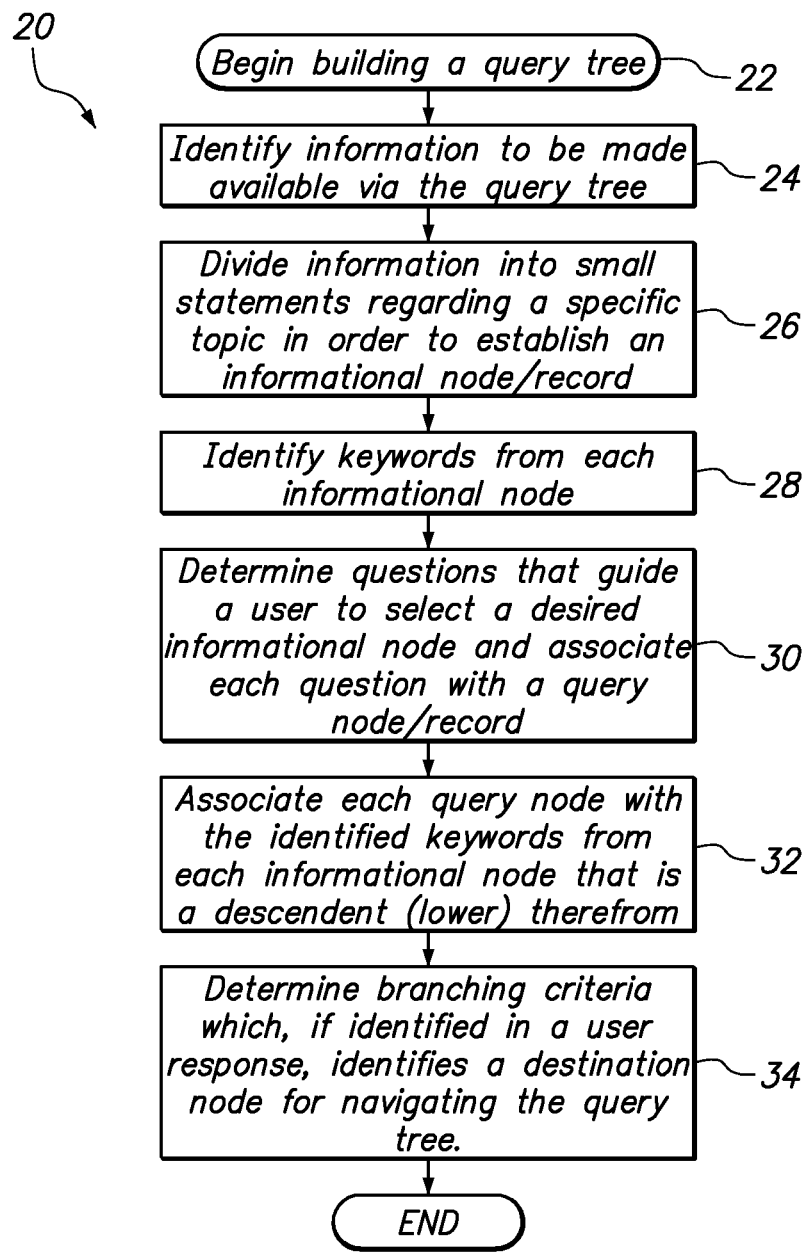
FIG. 5 is a flowchart of a method for building a query tree.

FIG. 5 is a flowchart of one embodiment of a method 20 for building a query tree. After deciding to begin building a query tree in step 22, information to be made available via the query tree must be identified in step 24. The scope of information will largely determine the complexity of the query tree. In step 26, the information is divided into small statements regarding a specific topic in order to establish an informational node or record. Preferably, the scope of the information will be complete as to a narrow topic that a user might inquire about. Keywords from each informational node are then identified in step 28.

In step 30, the query tree designer or programmer should determine questions that guide a user to select a desired information node and associate each of these questions with a query node or record. Then, in step 32, each query node is associated with the identified keywords that are propagated up through the query tree from each informational node. Branching criteria are determined, in step 34 which, if identified in a user response, will further identify a destination node (a query node or an informational node) for navigating the query tree.

Figure 6A:
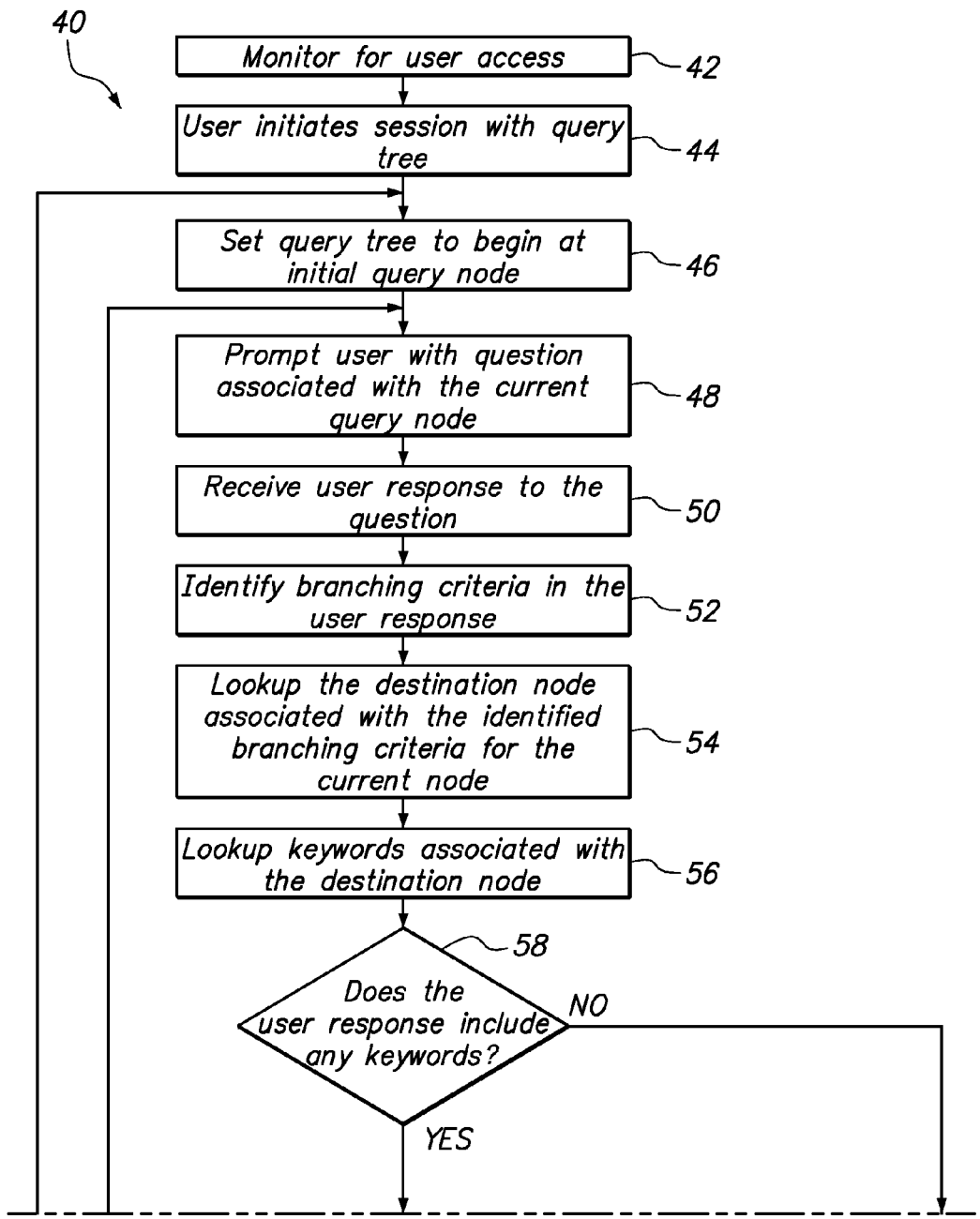
FIG. 6 is a flowchart of a method for operating a query tree.
Figure 6B:
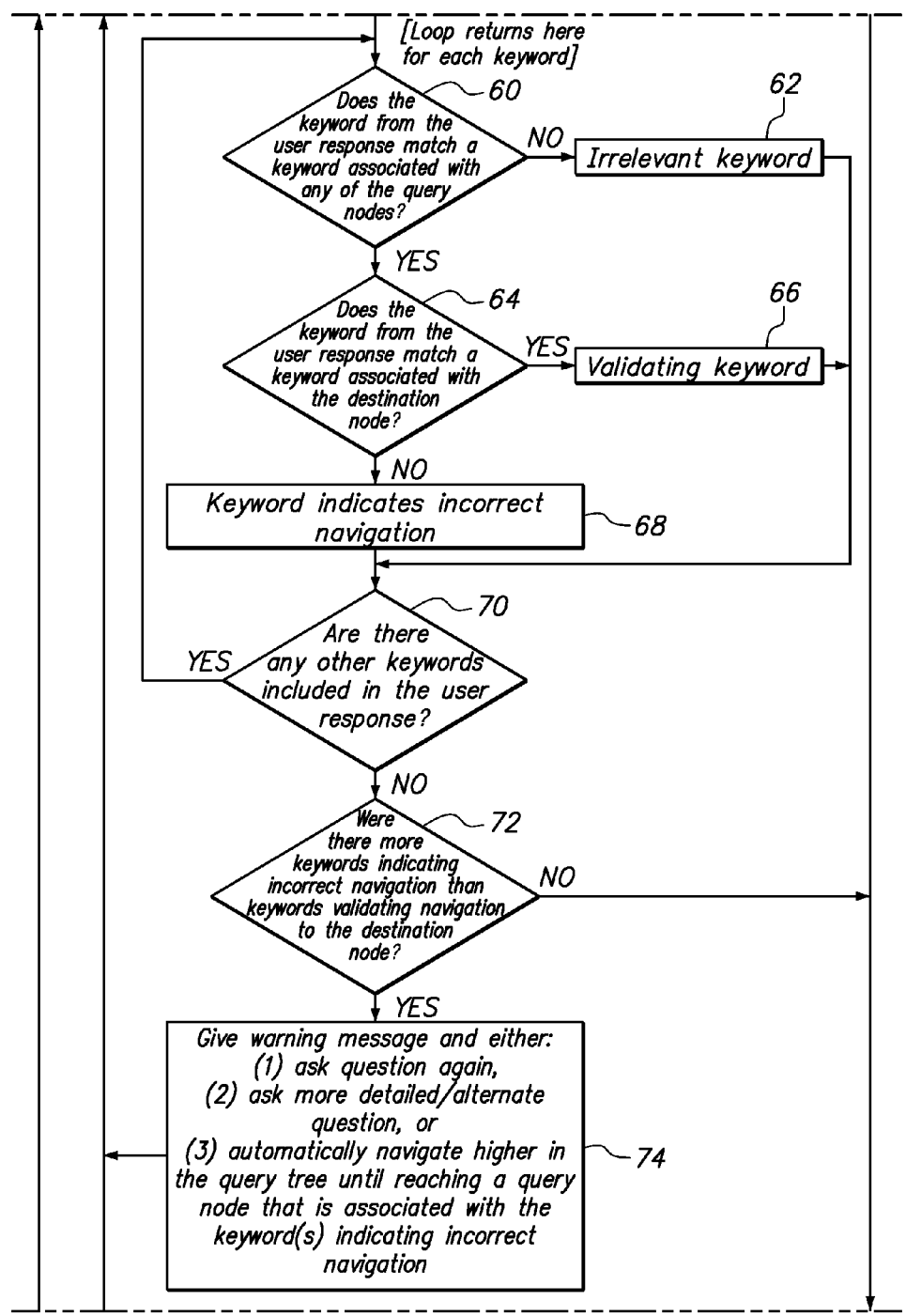
Figure 6C:
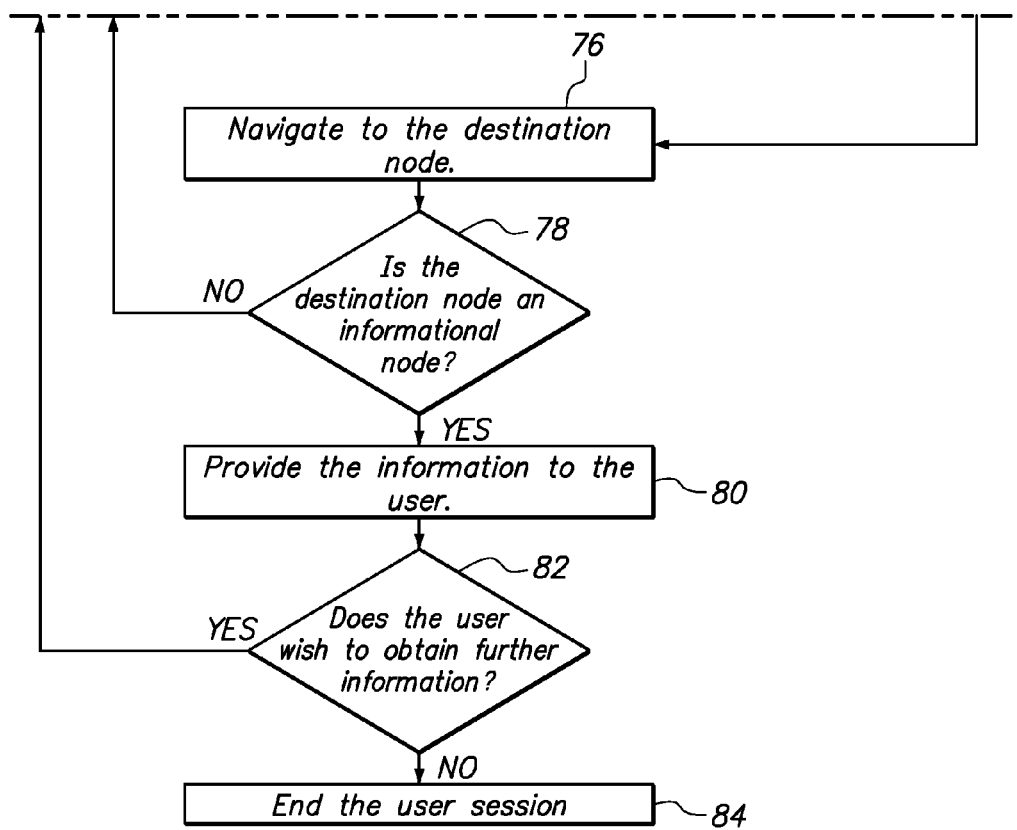

FIGS. 6A-6C provide a flowchart of one embodiment of a method 40 for operating a query tree. In step 42, a computer system (for example) monitors for a user attempting to access the query tree and, in step 44, allows the user to initiate a user session with the query tree. Step 46 sets the query tree to begin at an initial query node, which typically will be the highest node in the query tree but might also be the node last visited by a user having a user account that tracks and stores progress through the query tree from previous user sessions. The method then prompts the user with a question associated with the current query node (Step 48), receives a user response to the prompt (Step 50), identifies branching criteria in the user response (Step 52), looks up the destination node associated with the identified branching criteria for the current node (Step 54), and looks up keywords associated with the destination node (Step 56).

In step 58, it is determined whether the user response includes any keywords. If the user response does include keywords, then in step 60 (see FIG. 6B) it is determined whether the keyword from the user response matches a keyword associated with any of the query nodes. If there is no match, the keyword is deemed irrelevant in step 62. If there is a matching keyword, then in step 64 it is determined whether the keyword from the user response matches a keyword that has been associated with the destination node? If the matching keyword is associated with the destination node identified by the branching criteria, then the keyword validates navigation to the destination node. However, if the matching keyword is not associated with the destination node (i.e., it is associated only with a node higher in the query tree), then in step 68 the keyword indicates incorrect navigation of the query tree. If there are other keywords included in the user response, as determined in step 70, they are then analyzed in accordance with steps 60 to 68. When all keywords in the user response have been analyzed, the method continues to step 72.

In step 72, it is determined whether there were more keywords indicating incorrect navigation than keywords validating navigation to the destination node. If the determination is affirmative, then in step 74 the method may perform one or more steps to deal with the potentially incorrect navigation. These steps may include giving a warning message to the user and either: (1) ask question (prompt) again, (2) ask more detailed/alternate question(s), or (3) automatically navigate higher in the query tree until reaching a query node that is associated with the keyword(s) indicating incorrect navigation. Alternatively, the method could perform option (1) during a first iteration, perform option (2) during a second iteration, and perform option (3) during a third iteration. Following any of these options in step 74, the method returns to step 48 to provide a prompt to the user.

It should be recognized that there are many variations of the criterion that may be used in step 72 to identify potentially incorrect navigation. For example, an alternative embodiment may determine whether there are any keywords that indicate incorrect navigation. Other criterion within the scope of the invention will become apparent to those of ordinary skill in the art after having gained an appreciation of the present disclosure. Furthermore, it should be understood that the invention encompasses embodiments where keywords that validate navigation are completely ignored, applied to offset keywords indicating incorrect navigation, or even given more importance than keywords indicating incorrect navigation. Similarly, keywords indicating incorrect navigation may be the sole focus of identifying incorrect navigation, or just one factor in identifying incorrect navigation. Still further, it is the branching criteria that allow the user to advance down the query tree, without requiring the use of any keywords at all.

However, continuing with the present embodiment, if there were not more keywords indicating incorrect navigation than keywords validating navigation to the destination node in step 72, or if the user response did not include any keywords as determined in step 58, then the method continues to step 76 (see FIG. 6C) and navigates to the destination node. If the destination node is determined to be an informational node in step 78, then the information is provided to the user in step 80. If the destination node is not an informational node, then the method returns to step 48 in order to provide a further prompt to the user, which prompt is associated with the previously identified destination node. However, during this next pass through the method 40, the previously identified destination node is now designated as the current node.

After providing the user with information in step 80, the user is presented with the option to obtain further information in step 82. If the user wishes to obtain further information, then the method returns to step 46 so that the user begins navigating the query tree at the initial query node. If the user does not need other information, the user session ends in step 84.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method comprising:
   preparing a query tree having a plurality of query nodes, each query node including a query, branching criteria and predetermined keywords;
   prompting a user to respond to the query from a first one of the query nodes;
   receiving a user response to the query;
   analyzing the user response to identify a branching criteria and one or more user keywords; and
   comparing the one or more user keywords with the predetermined keywords from one or more of the query nodes.

2. The computer implemented method of claim 1, wherein comparing the one or more user keywords with the predetermined keywords from one or more of the query nodes includes comparing the one or more user keywords with the predetermined keywords from a query node that is identified by the branching criteria.

3. The computer implemented method of claim 2, further comprising:
   navigating from the first one of the query nodes to the query node identified by the branching criteria in response to the one or more user keywords matching the predetermined keywords from the query node identified by the branching criteria.

4. The computer implemented method of claim 1, further comprising:
   navigating from the first one of the query nodes to a different query node in the query tree in response to the one or more user keywords matching the predetermined keywords from at least one of the query nodes in the query tree and the one or more user keywords not matching the predetermined keywords from the query identified by the branching criteria.

5. A computer program product including computer usable program code embodied on a non-transitory computer usable storage medium, the computer program product comprising:
   computer usable program code for establishing a query tree, wherein the query tree includes a plurality of query nodes, a plurality of branches, and a plurality of informational nodes, each branch corresponding to branching criteria associated with a specific query node and directing navigation from the associated query node to another of the query nodes or one of the informational nodes, wherein each query node provides a prompt and each informational node provides information available to the user; and
   computer usable program code for associating each query node with one or more keywords.

6. The computer program product of claim 5, further comprising:
   computer usable program code for communicating a prompt to a user,
   computer usable program code for receiving a user response to the prompt;
   computer usable program code for analyzing the user response to identify a branching criteria that corresponds to one of the plurality of branches leading from the current query node to a different one of the query nodes or one of the informational nodes; and
   computer usable program code for analyzing the user response to identify one or more keyword received in the user response.

7. The computer program product of claim 6, further comprising:
   computer usable program code for navigating to another node in the query tree in consideration of the branching criteria from the user response and a comparison between the one or more keywords received in the user response and the one or more keywords associated with the query node.

8. The computer program product of claim 7, further comprising:
   computer usable program code for navigating to a destination node associated with the branching criteria in response to determining that the one or more keywords from the user response are relevant to the keywords associated with the destination node.

9. The computer program product of claim 7, further comprising:
   computer usable program code for accepting navigation to the destination node in response to determining that the one or more keywords from the user response are not relevant to keywords associated with query nodes proximal to the destination node.

10. The computer program product of claim 7, further comprising:
    computer usable program code for storing each user response received in relation to each question during a user session; and
    computer usable program code for returning to a previously navigated query node in response to determining that the user response to a current prompt includes keywords that are more relevant to the previously navigated query node than the current query node.

11. The computer program product of claim 6, further comprising:
    computer usable program code for repeating the prompt from the current query node in response to receiving a user response including a keyword that is not relevant to any of the keywords associated with any of the query nodes.

12. The computer program product of claim 6, wherein each prompt and each response is communicated over a telephone system, a computer network, or a combination thereof.

13. The computer program product of claim 6, wherein at least one of the query nodes includes branching criteria for three or more branches.

14. The computer program product of claim 5, further comprising:
    computer usable program code for navigating to a query node associated with keywords that are determined to be more relevant to the one or more keywords in the user response than the keywords associated with the current query node.

* * * * *